United States Patent [19]

Vaughn

[11] Patent Number: 4,641,871

[45] Date of Patent: Feb. 10, 1987

[54] SAFETY BUMPER AND AIR BRAKE ACTUATOR

[76] Inventor: Lanny Vaughn, 4334 Heights St., Pittsburg, Calif. 94565

[21] Appl. No.: 717,567

[22] Filed: Mar. 29, 1985

Related U.S. Application Data

[63] Continuation-in-part of Ser. No. 394,257, Jul. 1, 1982, abandoned.

[51] Int. Cl.$^4$ .............................................. B60R 19/00
[52] U.S. Cl. ........................................ 293/118; 293/5; 180/275
[58] Field of Search ..................... 293/5, 6, 132, 103, 293/118, 134; 180/275; 296/1 S

[56] References Cited

U.S. PATENT DOCUMENTS

| | | | |
|---|---|---|---|
| 3,847,427 | 11/1974 | Eshelman | 293/118 |
| 3,945,672 | 3/1976 | Wong | 293/5 |
| 3,947,061 | 3/1976 | Ellis | 293/5 X |
| 4,105,237 | 8/1978 | Viall, Sr. et al. | 293/5 X |
| 4,146,107 | 3/1979 | Ebbeson et al. | 180/275 |
| 4,207,958 | 6/1980 | Viall, Sr. et al. | 180/275 |
| 4,247,138 | 1/1981 | Child | 293/103 |
| 4,398,764 | 8/1983 | Okuyama | 296/1 S |

*Primary Examiner*—Robert B. Reeves
*Assistant Examiner*—Russell D. Stormer

[57] ABSTRACT

A retractable safety bumper and air brake actuator is provided in which a bumper is carried at the rear of a trailer such that as the bumper is engaged by an obstruction at the rear of the trailer, the bumper drives a piston to which it is attached into a sleeve, activating a switch and solenoid which release air from the trailer emergency air tank, through the trailer triple valve and into the brake pots of the trailer, thereby immediately locking the trailer brakes without affecting the tractor brakes.

4 Claims, 5 Drawing Figures

SAFETY BUMPER AND AIR BRAKE ACTUATOR

CROSS REFERENCE TO RELATED APPLICATION

This is a continuation-in-part of application Ser. No. 394,257 filed July 1, 1982 for "Safety Bumper and Air Brake Actuator" by the same applicant, and now abandoned.

BACKGROUND OF THE INVENTION

This invention relates to a safety air brake system for use in conjunction with a tractor trailer combination.

The prior art includes a variety of safety braking systems, including U.S. Pat. No. 4,207,958 which discloses a system for a dump truck, U.S. Pat. No. 3,023,829 which discloses a relatively complicated and cumbersome brake setting mechanism for a road vehicle. U.S. Pat. No. 4,105,237 discloses a safety braking system utilizing a rather specific combination of cables and pulleys which are believed to restrict the usefulness of that device. U.S. Pat. No. 4,146,107 discloses another rather cumbersome system for actuating air brakes upon detection of an obstacle.

SUMMARY OF THE INVENTION

The present invention provides an improved retractable safety bumper and air brake actuator which may be attached as a unit to a trailer, which is relatively inexpensive and which has relatively few components, thereby increasing its reliability. The system actuates the trailer brakes without affecting the tractor brakes.

DESCRIPTION OF THE PREFERRED EMBODIMENT

Figure 1:
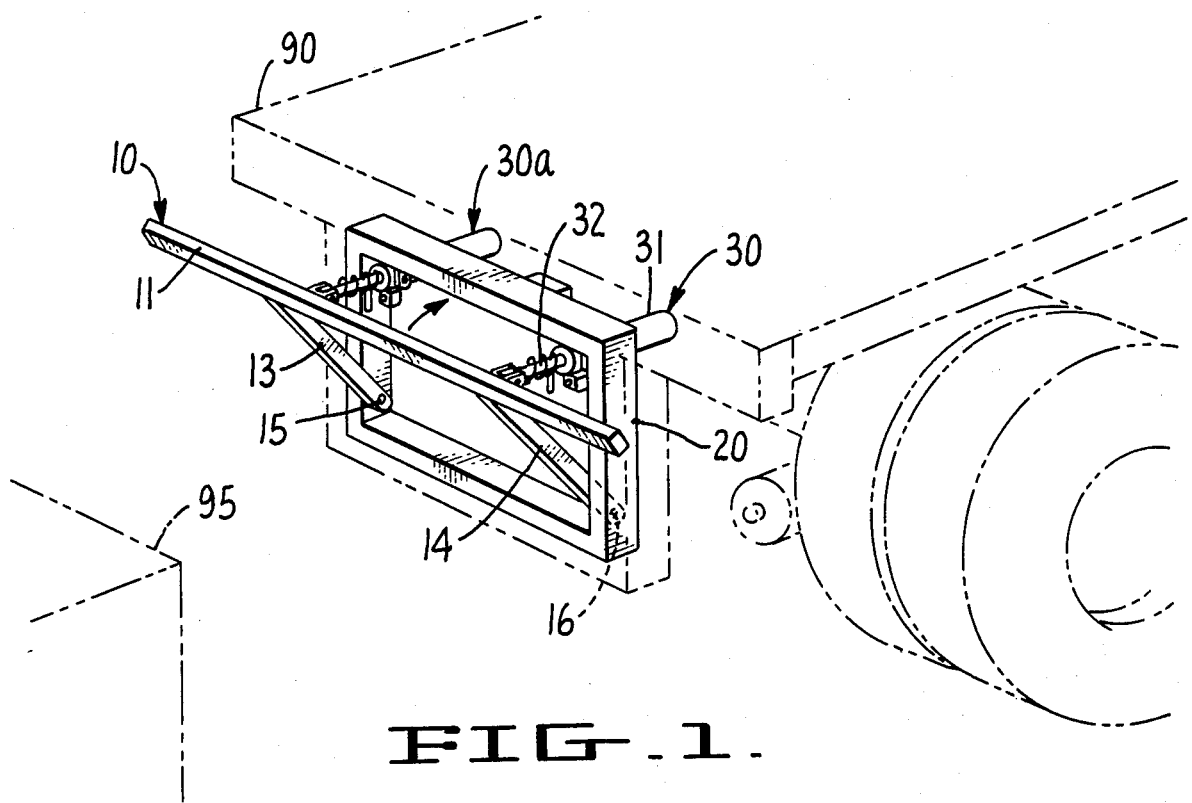
FIG. 1 is a perspective view of the safety bumper showing in phantom the outline of a trailer and the outline of a loading dock.
Figure 2:
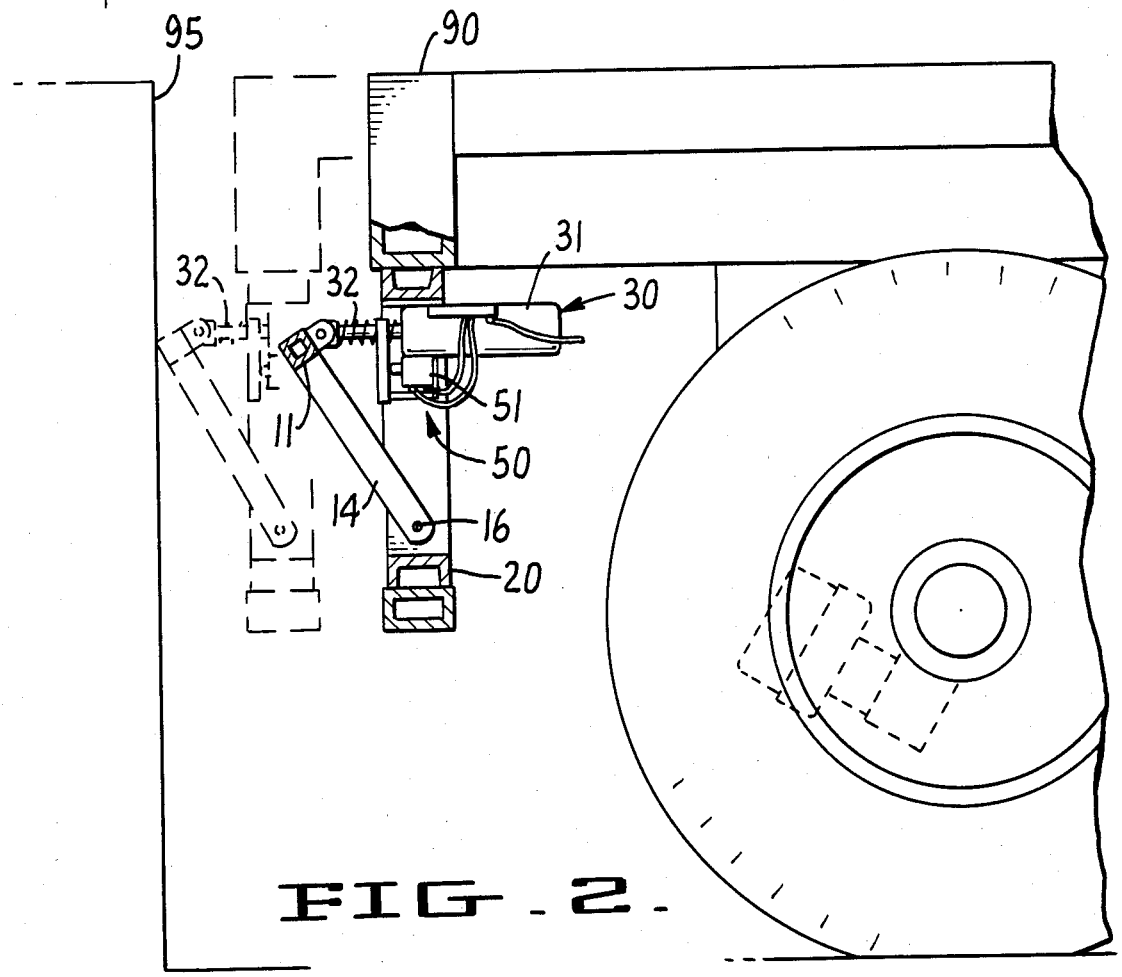
FIG. 2 is a side elevational view of the device of FIG. 1 showing in phantom the alternate position of the bumper.

As shown in FIGS. 1 and 2, the safety bumper shown generally as 10 is carried at the rear of a trailer shown in phantom as 90. Bumper means 10 has a horizontal bar 11 which extends the width of trailer 90 and a pair of parallel arms 13 and 14 connected to said bar, extending downwardly therefrom and being hingedly connected, respectively by pins 15 and 16 which extend through the rectangular portion 20 of the frame of trailer 90.

Cylinder means 30 has a sleeve portion 31 bolted to the frame 20 of trailer 90. A second cylinder means 30a is shown in FIG. 1. Although the device will operate with only one cylinder means, it is preferable to use two. A spring mounted piston 32 travels within sleeve 31 as shown best in FIG. 2 which shows piston 32 in phantom as it is driven into sleeve 31 by obstacle 95, which, for example, may be a loading dock or even a person.

Switch means 50 includes microswitch 51 and is positioned to sense the position of piston 32 within sleeve 31. When the piston 32 is driven sufficiently far into sleeve 31, microswitch 51 closes. As shown best in FIG. 3, solenoid means 60 is pneumatically connected between the emergency air tank 68 of the trailer by air line 61 and is connected pneumatically by air line 62 to the triple valve 69 of trailer 90. When solenoid means 60 is activated, high pressure air is immediately released from the emergency air tank 68, through triple valve 69 and through air lines 65 into the brake pots 66, thereby immediately locking all of the trailer brakes.

Figure 3:
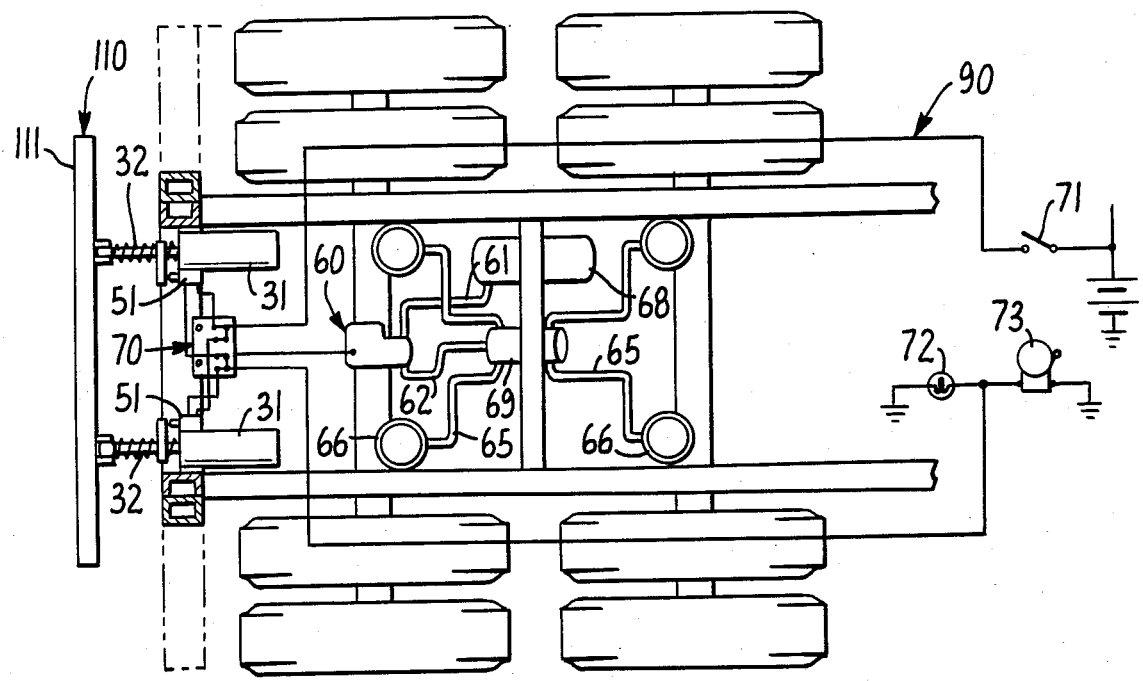
FIG. 3 is a schematic representation in plan view of a safety bumper and showing the electrical control circuit for the system.

As shown in FIG. 3, control means 70 is an electrical board connected to switches 51 and solenoid means 60. Switch 71 is connected to the transmission indicator in the tractor and is closed when the transmission is in reverse. Thus, the air brakes cannot be actuated by solenoid means 60 unless the transmission is in reverse. In the alternative, switch 71 may be a toggle switch on the dash of the cab. Warning light 72 and warning buzzer 73 are activated by the closing of switch 71.

When bumper 10 is fully retracted, bar 11 lies against frame 20 of trailer 90. Cylinder means 30 is a dual action air cylinder which retracts automatically when the transmission is taken out of reverse. When the transmission is placed in reverse, the piston 32 of cylinder means 30 is driven in the direction of extending bar 11. The air pressure within cylinder means 30 is reduced by a pressure regulator down from the tractor air pressure of 120 p.s.i. to approximately 10 p.s.i. to facilitate easy depression of piston 32 by an obstacle.

I have found that by using a ten inch travel of piston 32, my safety bumper will stop a tractor-trailer backing down an approximately six degree incline at three miles per hour in less than 5 inches travel of piston 32. The safety bumper can be depressed with a force of approximately 10 pounds.

Figure 4:
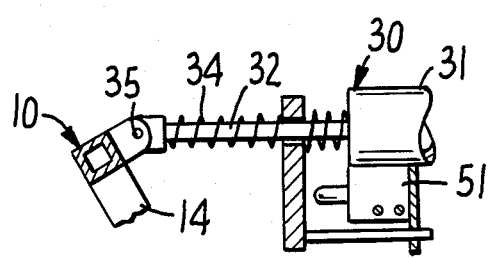
FIG. 4 is an enlarged view of a portion of the device.

FIG. 4 shows in greater detail cylinder means 30. Piston 32 is retracted from sleeve 31 by spring 34. Pin 35 connects piston 32 to arm 14 of bumper means 10.

Figure 5:
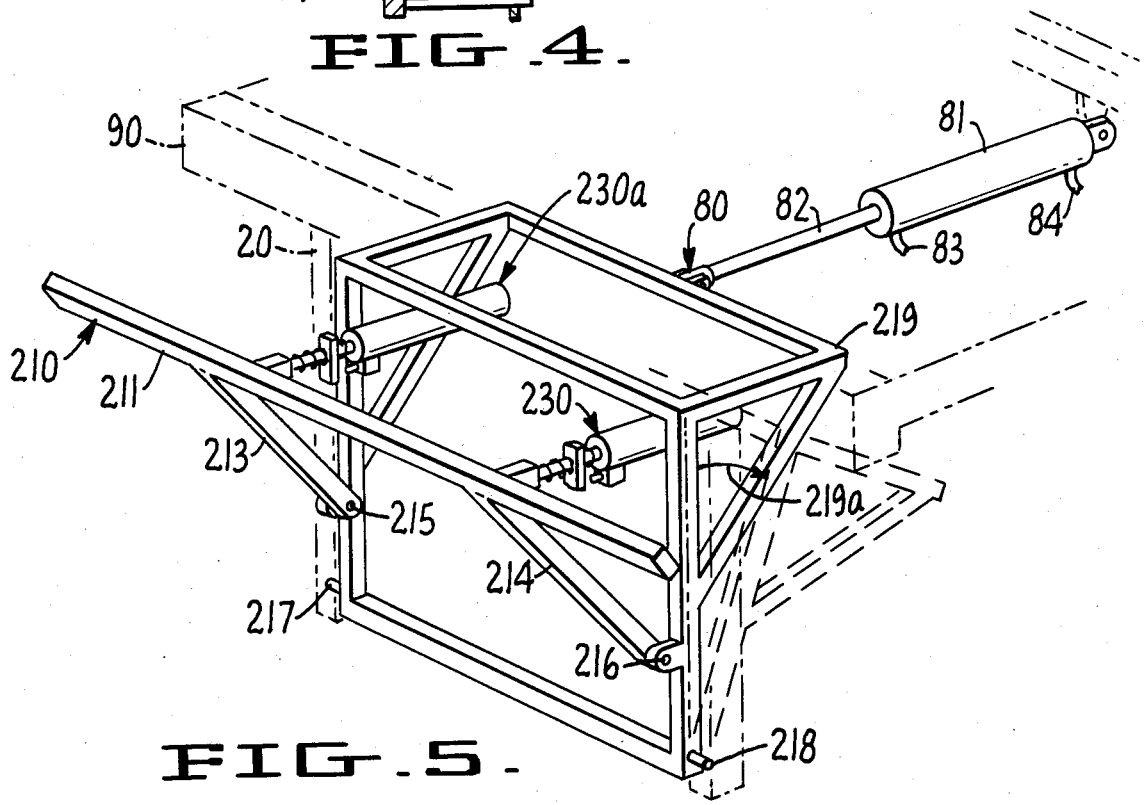
FIG. 5 is a side elevational view of an alternate embodiment of the invention.

FIG. 5 shows an alternate embodiment wherein the parallel arms depending from bar 11 telescope as shown by upper portion 114a which extends over lower portion 114b. This feature allows piston 32 to travel horizontally.

I claim:

1. A safety bumper and air brake actuator for use in conjunction with the air brake system of the tractor-trailer, wherein the existing air brake system of said trailer includes a emergency air supply tank and a triple valve adjacent the rear wheels of the trailer, comprising:

retractable bumper means carried at the rear of said trailer comprising a horizontal bar which extends the width of said trailer and a pair of parallel arms connected to said bar, extending downwardly therefrom and being hingedly connected to the frame of said trailer, such that as said tractor-trailer is travelling forward at highway speed, said retractable bumper means is fully retracted so that said horizontal bar lies against the frame of said trailer in its retracted position, bumper extension means which operates in response to the position of the tractor transmission indicator to extend said bumper means when the tractor transmission is placed in reverse and to fully retract said bumper means when the tractor transmission is taken out of reverse, cylinder means, having a piston slidably mounted in a sleeve, connected to said bumper means such that as said bumper means engages an obstruction at the rear of said trailer, said piston is driven into said sleeve, switch means responsive to the position of said piston, solenoid means positioned adjacent the rear wheels of said trailer and pneumatically connected between the trailer's existing emergency air supply tank and existing triple valve of said trailer, and control means connected to said switch means and said solenoid means such that when said piston is driven to a predetermined position within said sleeve, said switch means and control means cooperate to actuate and open said solenoid means whereby high pressure air from said trailer emergency air tank passes through said solenoid means and said triple valve and immediately actuates and locks the brakes of said trailer without affecting the brakes of the tractor.

2. The apparatus of claim 1 wherein said parallel arms each comprise a pair of telescoping portions to allow said piston to travel horizontally.

3. The apparatus of claim 1 wherein said cylinder means is a dual action pneumatic cylinder which retracts said safety bumper automatically when said tractor transmission is taken out of reverse and which extends said safety bumper when said tractor transmission is placed in reverse.

4. The apparatus of claim 3 further comprising a pressure regulator which reduces the air pressure in said cylinder so that a force of ten pounds will depress the safety bumper.

* * * * *